United States Patent
Rockwood et al.

(10) Patent No.: US 6,853,964 B1
(45) Date of Patent: Feb. 8, 2005

(54) SYSTEM FOR ENCODING AND MANIPULATING MODELS OF OBJECTS

(76) Inventors: Alyn Rockwood, 18375 Highland Estate Dr., Colorado Spring, CO (US) 80908; Hongbo Li, Building 902, Room 1002, Zhong Guan Cun District, Beijing 100080 (CN); David Hestenes, 2416 S. Palm Dr., Tempe, AZ (US) 85282

(*) Notice: Subject to any disclaimer, the term of this patent is extended or adjusted under 35 U.S.C. 154(b) by 743 days.

(21) Appl. No.: 09/609,106

(22) Filed: Jun. 30, 2000

(51) Int. Cl.$^7$ .......................... G06F 7/60; G06F 17/10; G06F 101/00
(52) U.S. Cl. ................ 703/2; 703/1; 703/22; 700/245
(58) Field of Search ................ 703/1–2; 700/245–264; 345/619

(56) References Cited

U.S. PATENT DOCUMENTS

| | | | |
|---|---|---|---|
| 5,268,998 A | 12/1993 | Simpson | 395/127 |
| 5,943,056 A | 8/1999 | Sato et al. | 345/419 |
| 5,973,678 A | 10/1999 | Stewart et al. | 345/184 |
| 6,054,997 A | 4/2000 | Mirtich | 345/433 |
| 6,064,168 A | 5/2000 | Tao et al. | 318/568 |
| 6,070,109 A | 5/2000 | McGee et al. | 700/259 |

OTHER PUBLICATIONS

Hestenes et al, "Generalized Homogeneous Coordinates for Computational Geometry," paper available at: http://modelingnts.la.asu.edu/html/AFCG.html (date unknown).*

Dorst, "Geometric (Clifford) Algebra: A Practical Tool for Efficient Geometrical Representation," Dept. of Computer Science, University of Amsterdam, pp. 1–41 (May 1999) (paper available at http://carol.science.uva.nl/~leo/clifford/talknew.ps).*

Li, "Some Applications of Clifford Algebra to Geometries," Lecture Notes in Computer Science, vol. 1669 / 1999, ISSN: 0302–9743, pp. 156–179 (1999).*

Bayro–Corrochano et al, "Object Modeling and Collision Avoidance Using Clifford Algebra," Lecture Notes in Computer Science, vol. 970, pp. 699–706 (1995)(paper available at: http://citeseer.nj.nec.com/577987.html).*

Mourrain et al, "Applications of Clifford Algebras in Robotics," Computational Kinematics (Merlet and Ravani, Editors), pp. 41–50 (1995)(paper available at:http://citeseer.nj.nec.com/mourrain95application.html).*

Ravani et al, "Kinematic Localization for World Model Calibration in Off–Line Robot Programming Using Clifford Algebra," 1991 IEEE International Conference on Robotics and Automation, vol. 1 pp. 584–589 (Apr. 1991).*

Lasenby et al., "A Unified Mathematical Language for Physics and Engineering in the $21^{st}$ Century"; Phil. Trans. R. Society Lond. A (2000) 358, pp. 21–39.

Mann, et al., "*The making of a geometric algebra package in Matlab,*" Computer Science Department, University of Waterloo, Research report CS–99–27, 1999.

* cited by examiner

*Primary Examiner*—Samuel Broda, Esq.
(74) *Attorney, Agent, or Firm*—Dirk Brinkman; Andrew J. Curtin (57) ABSTRACT

A method models an object composed of one or more components. Data are input to a memory of a computer system for each component of the object. The data include Cartesian coordinates expressed in Euclidean space of a plurality of points x of each component. Each component point x is encoded as a vector x in a general homogeneous space by $x=(x+½x^2e+e_*)E=xE-½x^2e+e_*$, where e and $e_*$ are basis null vectors of a Minkowski space E. General homogeneous operators are associated with each data point to generate a model of the object. The general homogeneous operators are applied to each encoded point of the associated component for each component to manipulate the model of the object.

14 Claims, 5 Drawing Sheets

| Type (401) | Euclidean (402) | Homogeneous (403) | $\sigma(X)$ (404) |
|---|---|---|---|
| Reflection | $-nxn + 2n$ | $s = n + e\sigma$ | $1$ |
| Inversion | $\dfrac{p^2}{x-c} + c$ | $s = c - \dfrac{1}{2}p^2 e$ | $\left(\dfrac{x-c}{p}\right)^2$ |
| Rotation | $R(x-c)R^{-1} + c$ | $R_c = R + e(c \times R)$ | $1$ |
| Translation | $x - a$ | $T_a = 1 + \dfrac{1}{2}ae$ | $1$ |
| Transversion | $\dfrac{x - x^2 a}{\sigma(x)}$ | $K_a = 1 + ae_0$ | $1 - 2a \cdot x + x^2 a^2$ |
| Dilation | $\lambda x$ | $D = e^{-\frac{1}{2}E \ln \lambda}$ | $-1$ |
| Involution | $x^* = -x$ | $E = e \wedge e_0$ | $-1$ |

SYSTEM FOR ENCODING AND MANIPULATING MODELS OF OBJECTS

FIELD OF THE INVENTION

The present invention relates generally to computerized systems that generate models from the geometry, shape, and other attributes of objects, and, more particularly, to systems that manipulate the models. The models are usable by computer-aided design tools, robotics, molecular modeling, kinematics and dynamics of linked bodies, collision detection, satellite positioning, articulated characters in animation and for use in the educational, scientific, business, and entertainment fields.

BACKGROUND

Points, lines, planes, and spheres of all dimensions can be used to describe basic objects or components. These basic objects can be assembles into more complex objects. Therefore, the manipulation and proximity testing of the basic objects has wide-ranging implications for many problems in engineering, computer graphics, and the practical sciences.

For example, in robotics and many haptic devices, a tool is typically composed of rigid links connected to each other at joints. The possible positions of the distal end of each link, assuming complete rotational freedom at the joints, is of course a sphere, see U.S. Pat. Nos. 6,070,109, 6,064,168, and 5,973,678.

In order to check for interference with an obstacle in the vicinity of the tool, one can first check to see if bounding spheres intersects. This is a much simpler computation than determining exactly the coordinates of all of the individual parts. Only when the bounding spheres intersect does it become necessary to do the more rigorous computation on the exact coordinates to determine actual interference.

In rigid body kinematics and CAD/CAM, a frequent problem is to check for collisions between arbitrarily shaped objects, see U.S. Pat. Nos. 6,054,997 and 5,943,065. This problem can also be simplified by first circumscribing each object with a bounding sphere. Now, one can first simply check for collisions between spheres, and only when there is a possible collision of spheres does one have to do the more complex computation to check for actual collision.

In graphics rendering, it is common to parametrically represent objects as polygons or Bezier surface patches. Frequently, it is necessary to rotate objects. The rotation of a complex object can simply be done by rotating points on the patches (planes) along spherical surfaces having their origin at the center of rotation.

In fluid dynamnics, and electrostatic problems, one frequently manipulates angle preserving conformal surfaces, see U.S. Pat. No. 5,453,934. In higher dimensional geometries, a conformal surface can be represented by spherical rotation. Clearly, operations with a spherical surface would be much easier than operating on a complex surface such an airfoil.

In a Cartesian model of Euclidean space, the calculations performed on spheres are generally of the form:

$$\text{Operator}((x+h1)^2+(y+i1)^2+(z+j1)-r1^2,(x+h2)^2+(y+i2)^2+(z+j2)-r2^2)$$

where "Operator" represents some spherical operation such as intersection, union, containment, tangent, translation, rotation, etc., and combinations thereof. In most of these application, event these simpler spherical computations, due their enormous numbers, still consume most of the system's resources when manipulating object models. Similar calculations can be performed on planes.

Therefore, it is desired to provide a new method for representing models of objects which solves these problems for practical modeling and simulation problems of physical objects. Furthermore, it desired to manipulate the models without having to consider the actual Cartesian coordinates of the underlying objects.

SUMMARY OF THE INVENTION

The present invention encodes points of components of objects measured in Euclidean three-space G(3,0) to null vectors in a general homogeneous four-space G(4,1). This encoding makes it possible to directly determine scalar distances between points by vector inner products.

In addition, planes and spheres planes in G(3) can be represented by non-null vectors in G(4,1) so that distances between planes can also be computed by vector inner products which yields a scalar.

All relations among points, lines, planes, and spheres in G(3) can be represented or determined in G(4, 1) without having to resort to their actual coordinates, as in the prior art.

Common operations such as 3-D rotational and translational kinematics of objects is described by a single spinor equation in G(4,1). The 3-D rotational and translational dynarmics of a rigid object is described by a single bivector equation in G(4, 1).

More particularly, the invention provides a method for modeling an object composed of one or more components. Data are input to a memory of a computer system for each component of the object. The data of each component point include Cartesian coordinates expressed in Euclidean space of a plurality of points x of each component.

Each component point x is encoded as a vector x in a general homogeneous space by $$x = \left(x + \frac{1}{2}x^2 e + e_*\right)E = xE - \frac{1}{2}x^2 e + e_*,$$

where e and $e_*$ are basis null vectors of a Minkowski space E. General homogeneous operators are associated with each data point to generate a model of the object.

The general homogeneous operators are applied to each encoded point of the associated component for each component to manipulate the model of the object. The operators can be in terms of processes executing in the computer system.

DETAILED DESCRIPTION OF THE PREFERRED EMBODIMENT

System Overview

Figure 1:
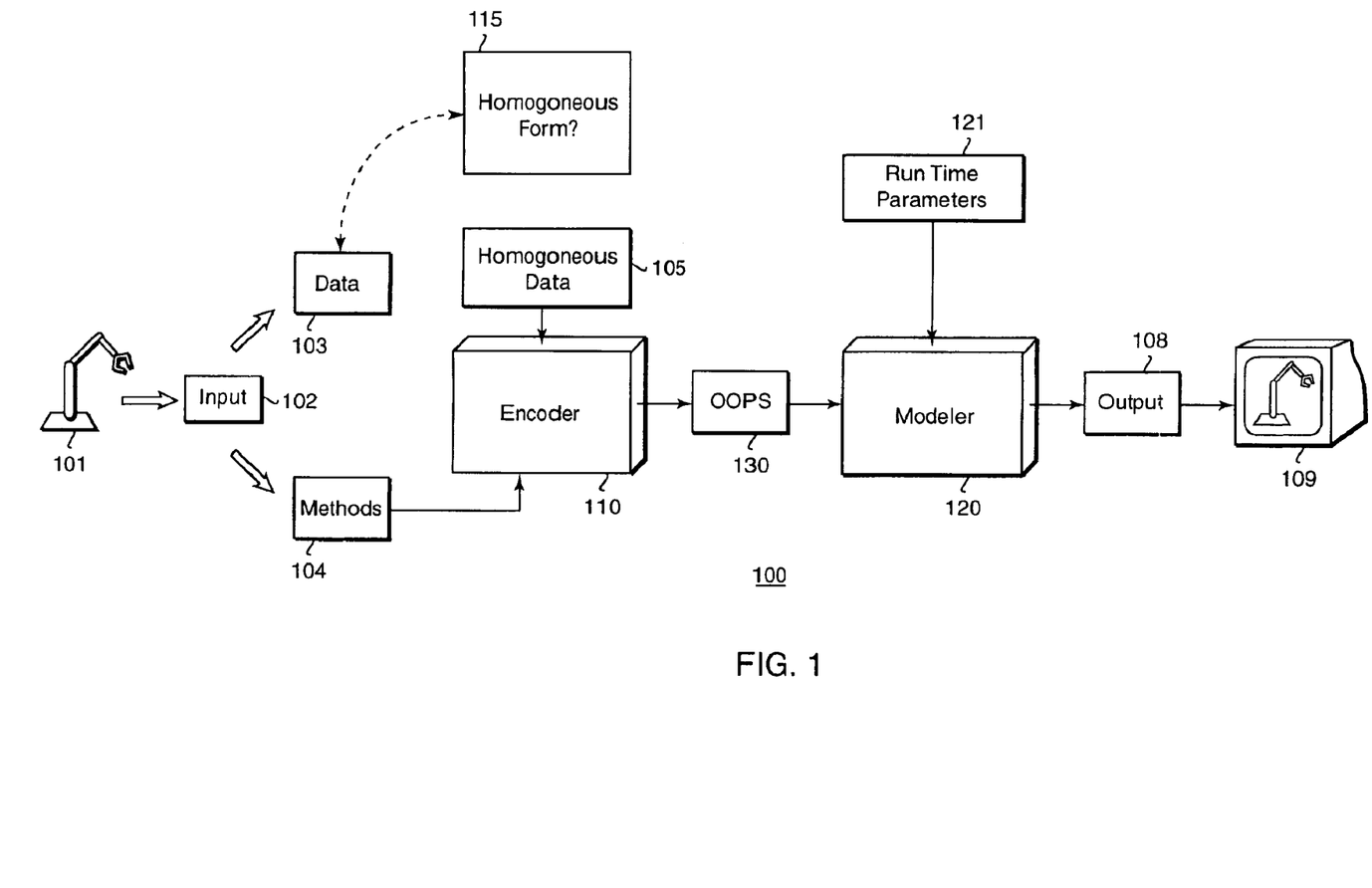
FIG. 1 is a block diagram of a modeling system according to the invention.

As shown in FIG. 1, our invention is a system 100 for generating and manipulating a computerized model of a real or virtual object 101, for example a robot. The object is composed of basic components such as links and joints. The object is the "input" 102 into the system 100. The input can be described in terms of the geometry (data or constructs) 103 of the basic components, and the operations (methods or operators) 104 that can be applied to the basic components.

The data 103 can be points, lines, planes, and spheres. The data can be acquired by measuring the objects, or the data can be parametrically defined. The data are stored in a memory of a computer system. The methods 104 can be linkage dynamics, torque forces, transformations, rotations, constraints, and the like. The methods can be implemented as programs executing in the computer.

The system 100 according to our invention operates the model in a homogeneous space (G(4, 1)). Homogeneous space is described in greater detail below. We presume that the methods 104 are already in a homogeneous form. However, the data 103 expressing the geometry of the basic components most likely use Cartesian coordinates of Euclidean space (G(3,0)). Therefore, step 115 can convert the data 103 to homogeneous form 105 where necessary. The encoder 110 combines the homogeneous data and corresponding homogeneous methods to generate classes that together for an object-oriented programming structure (OOPS) 130.

The modeler 120 operates on the OOPS 130 using run-time parameters 121 to determine distances, intersections, and tangencies of the basic components, and to perform operations such as rotations and displacements of the basic components. In an object oriented programming structure, methods are applied to data. Output of the modeler 120 can be rendered as images on a display device 109.

As will be described, the result of many of the operations, for example, operation that measure distances, result in a scalar. Therefore, the result does not need to be decoded, and can be directly used in the context of the originating Euclidean space. In other words, as an advantage of our invention, the output 108 of the modeler 120 can be directly processed by any standard rendering engine, or the robotic tool itself, without decoding or converting.

The homogeneous constructs and operators (OOPS) 130 generated by the encoder 110 and used by modeler are derived using geometric algebra.

Geometric algebra is described extensively by Hestenes in "New Foundations for Classical Mechanics," Kluwer (second edition), 1999. Geometric algebra has been used extensively to describe the mechanics of particles, rigid bodies, biomechanics, robotics, computer vision, computer aided design, orbital mechanics of space programs, and many other practical fields. Geometric algebra is a general modeling system for a wide range of physical phenomena. Starting from a small number of simple rules that define the geometric algebra, one can derive vector algebra, quaternions, and spinor representations of quantum mechanics. However, applications of geometric algebra in our "generalized" homogeneous space are new.

The standard model for Euclidean space $E^n$ is an n-dimensional real vector (Cartesian) space $R^n$ or, equivalently, a set of real coordinates. One trouble with this model is that the origin is a distinguished element, whereas all the other points of $E^n$ are identical. This deficiency in the vector space model can be corrected by removing the origin from the plane and placing it in a space one dimension higher.

We do this by placing our model in general homogeneous space. In general homogeneous space there are no coordinates. Our model also provides for an adequate representation for Euclidean points or lines at infinity.

The idea underlying our general homogeneous space for "points" in $R^n$ is to remove the troublesome origin by embedding $R^n$ in a space of higher dimension with a displacing "null" vector. As stated above, we measure or model objects in the Euclidean space $E^n$ as a set of points with parametric properties. A standard way to do this is by identifying each Euclidean point of an object with a vector x in $R^n$, as expressed by the isomorphism $$E^n \cong R^n,$$

We call this the inhomogeneous model of $E^n$, because its origin 0 is a distinguished point in $R^n$, even though all points in $E^n$ are supposed to be identical.

Constructs

Following are some of the basic data constructs used by our encoder and modeler.

Scalars and Vectors

Geometric algebra is built over a real, n-dimensional vector space. Thus, we use the structures of scalars and vectors as are well known in the art of geometric algebra.

Null Vector

If a vector $a \neq 0$, but the absolute value of vector $|a|=0$, then vector a is a null vector. In geometric algebra a null vector can exist when $a \neq 0$.

K-Blade

The outer product of k vectors, determined by $$a_1 \wedge a_2 \wedge \ldots \wedge a_k,$$

s defined as the antisymmetric part of the geometric product $a_1 a_2 \ldots a_k$. The resulting quantity is called a k-blade, where k is called the grade of the blade.

Pseudoscalar

The largest grade k-blades are called pseudoscalars. We reserve I as a special symbol for a largest k-blades because these are all scalar multiples of a single unit pseudoscalar.

Versor

A quantity $$U = u_k u_{k-1} \ldots u \tag{1}$$

generated by a product of non-null vectors is called a versor

Operators

In order to properly define a class, it is also necessary to define the applicable operators (methods) 104. For the above constructs, the operations are defined according to geometric algebra. Thus, for example, a linear transformation $\underline{U}$ on the vector space $R^{p,q}$ is said to be orthogonal when the trans formation preserves the inner product of vectors, as specified by:

$$(\underline{U}a)\cdot(\underline{U}b)=a\cdot b.$$

Every orthogonal transformation $\underline{U}$ is determined by a versor U via the equation:

$$\underline{U}(x)=\epsilon UxU^{-1}, \quad (2)$$

where $\epsilon$ is the parity of U. This reduces orthogonal transformations to multiplication by versors.

A multiplication by versors has at least two great advantages. First, it reduces composition of orthogonal transformations to multiplication of versors. Second, it enables us to represent and visualize any orthogonal transformation as a set of vectors via equation (1). Third, the result is a scalar that provides the answer to the problem originally expressed in Euclidean space.

In addition, we also define a new class, which leads to the encoding of the input 102 into new data structures 104 that are subsequently operated on with new methods.

Minkowski Plane E

Figure 2:
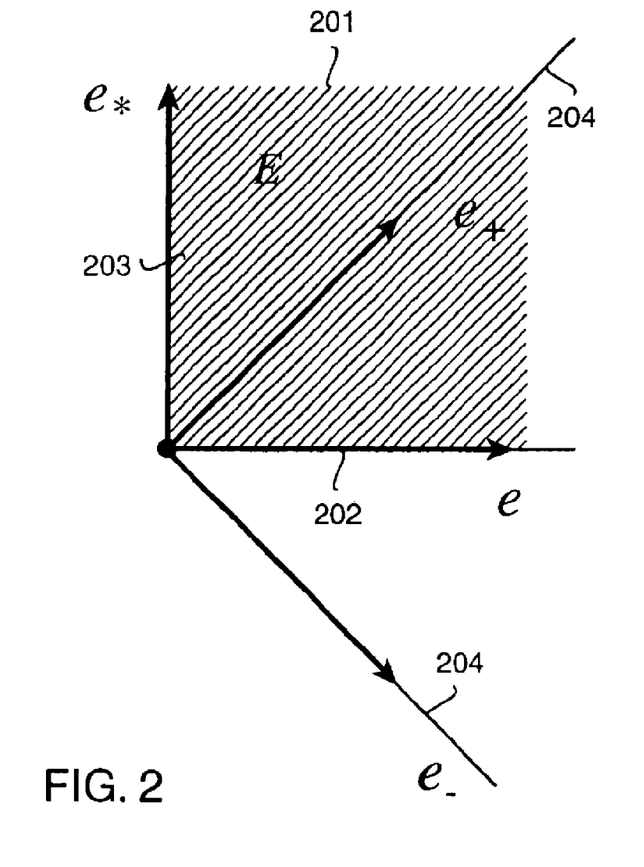
FIG. 2 is a graph of a Minkowski plane used by the present invention.

As shown in FIG. 2, a Minkowski E plane 201 is generated, from two unique basis null vectors e 202 and $e_*$ 203, i.e., a basis vector $\{e, e_*\}$ with a fixed direction and variable scale. The null basis vectors have the following constraints $$e^2=0=e_*^2,$$

and $$ee_*=1+E,\ e_*e=1-E,$$

where $E=e \wedge e_*$ is a unit 2-blade, that is, $E^2=1$. This is called the Minkowski plane E. An alternative but equivalent orthonormal unique basis vector, with a variable direction and fixed scale, is $\{e_-,e_+\}$ 204. Because the orthonormal basis vector 204 has a fixed scale but an arbitrary direction, we prefer the null basis vectors 202–203.

Conformal Split

Figure 3:
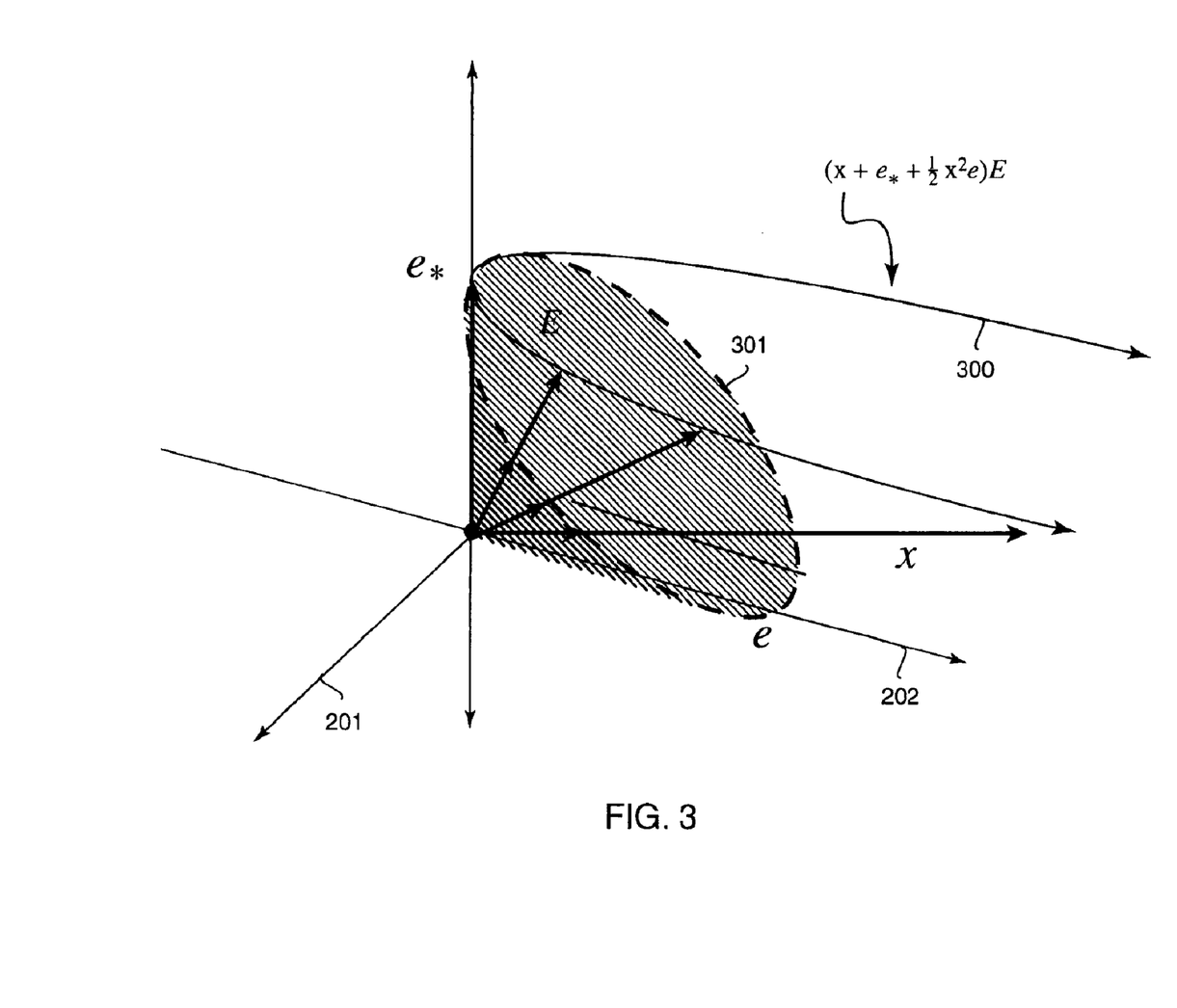
FIG. 3 is a graph of a homogeneous space where objects are modeled according to the invention.

As shown in FIG. 3, a conformal split allows us to relate objects and operations between spaces of different dimensions, particularly to relate operations (methods) on data expressed in Euclidean and homogeneous spaces. The conformal split is realized by intersecting the cone of null vectors 301 generated by $\{e,e_*\}$ with the plane orthogonal to $\underline{e}$, resulting in the so-called horosphere 300. The horosphere was originally described by F. A. Wachter (1792–1817), a student of Gauss. He showed that a certain type of surface in hyperbolic geometry is geometrically equivalent to Euclidean space. Our invention shows that the horosphere 300 constitutes a homogeneous model of Euclidean space.

Unlike Wachter, we formulate the horosphere in terms of geometric algebra. Thus, our horosphere finally becomes a practical tool many real-world modeling applications.

Homogeneous Point

Using the horosphere 300, we encode any input data point x of an object component in the data 103 in standard Euclidean space, into a new point x in a homogeneous space, using $$x = \left(x + \frac{1}{2}x^2 e + e_*\right)E = xE - \frac{1}{2}x^2 e + e_*, \quad (3)$$

which expresses x in terms of input x.

Homogeneous Point, Line, Plane and Hyperplane

For independent input vectors $a_0, a_1, \ldots a_m$ of the data 103, where m=0 defines a point, m=1 defines a line, m=2 defines a plane, m=3 defines a hyperplane, etc., a corresponding vector p is encoded respectively for a homogeneous point, line, plane, hyperplane by $$p=IE(e \wedge a_0 \wedge a_1 \wedge \ldots \wedge a_m).$$

Homogeneous Sphere

An input sphere of a radius r, and a center c having coordinates of m dimensions, we encode a m-dimensional vector s, called the homogeneous sphere, by $$s = c + \frac{1}{2}r^2 e.$$

Note that in our new homogeneous classes all objects, i.e., points, lines, planes, hyperplanes, and spheres of any dimensions, are exclusively represented as vectors.

Thus, our invention leads to much simpler novel operations used by our modeler 120. Specifically we describe the following new methods, which operate on our homogeneous representation of the basic homogeneous constructs.

Distance Between Points

The Euclidean distance $d_{ab}$ between two Euclidean input points a and b is determined for homogeneous encoded points a and b by $$d_{ab}^2=(a-b)^2=-2a\cdot b,$$

a scalar directly useable in Euclidean space without having to do any further conversion.

Length of a Line Segment

The length of line, or line segment through two input points a and b is determined for encoded homogeneous points a and b by $$(\text{length})^2=(e \wedge a \wedge b)^2=(a-b)^2.$$

also a scaler.

Triangular Area

The homogeneous area of plane given by input points a, b, c, or the triangular plane segment with vertices a, b, c is determined by $$(\text{area})^2 = \frac{1}{4}(e \wedge a \wedge b \wedge c)^2,$$

a scalar.

Distances Between Points and Objects

The distances between homogeneous point a, plane p and sphere s are determined by the respective inner products $$a\cdot p,\ a\cdot b,\ a\cdot s,\ p\cdot s,$$

a scalar.

Distances Between Spheres

The scalar distances between two homogeneous spheres $s_1 = c_1 + \frac{1}{2}r_1^2 e$ and $$s_2 = c_2 + \frac{1}{2}r_2^2 e$$

is determined by $$s_1 \cdot s_2 = c_1 \cdot c_2 + \frac{1}{2}(r_1^2 + r_2^2) = -\frac{1}{2}[(c_1 - c_2)^2 - (r_1^2 + r_2^2)].$$

Rigid Body Motion

According to Charles' Theorem, any rigid displacement can be expressed as a screw displacement. Therefore, the motion of a rigid body in homogeneous space is determined by a time dependent displacement versor $D=D(t)$ satisfying the differential equation $$\dot{D} = \frac{1}{2}VD,$$

with a "screw velocity" V given by $$V = -I\omega + ev,$$

where $\omega$ is the angular velocity and v is the translational velocity of the body.

Dynamics of a Rigid Body

The dynamics of a rigid body in homogeneous space is determined by the differential equation $$\dot{P} = W$$

with $$P = -IL + e \cdot p \text{ and } W = -IT + e \cdot F,$$

where L is the angular momentum and p is the translational momentum of the body, while T is the net torque and F is the net force on the body.

Conformal Transformations

When equation (3) is substituted into (2) we get $$\varepsilon U\left(x + \frac{1}{2}x^2 e + e_*\right) EU^{-1}E = \sigma\left(x' + \frac{1}{2}x'^2 e + e_*\right)$$

where $\sigma$ is a scale factor. The scale factor can be used for normalization purposes. This equation determines a transformation of each input vector x into a unique vector $$x' = g(x).$$

This induced function $g(x)$ is a conformal transformation of input vectors and every conformal transformation can be generated in this way. A transformation is said to be conformal if it preserves angles between intersecting curves in the space being transformed.

Every conformal transformation function $g(x)$ can be represented by a versor U and composition of conformal transformations is reduced to multiplication of versors as expressed by equation (2).

The ability to compute conformal transformations by multiplication this way is new and important innovation for manipulation of objects.

Figure 4:
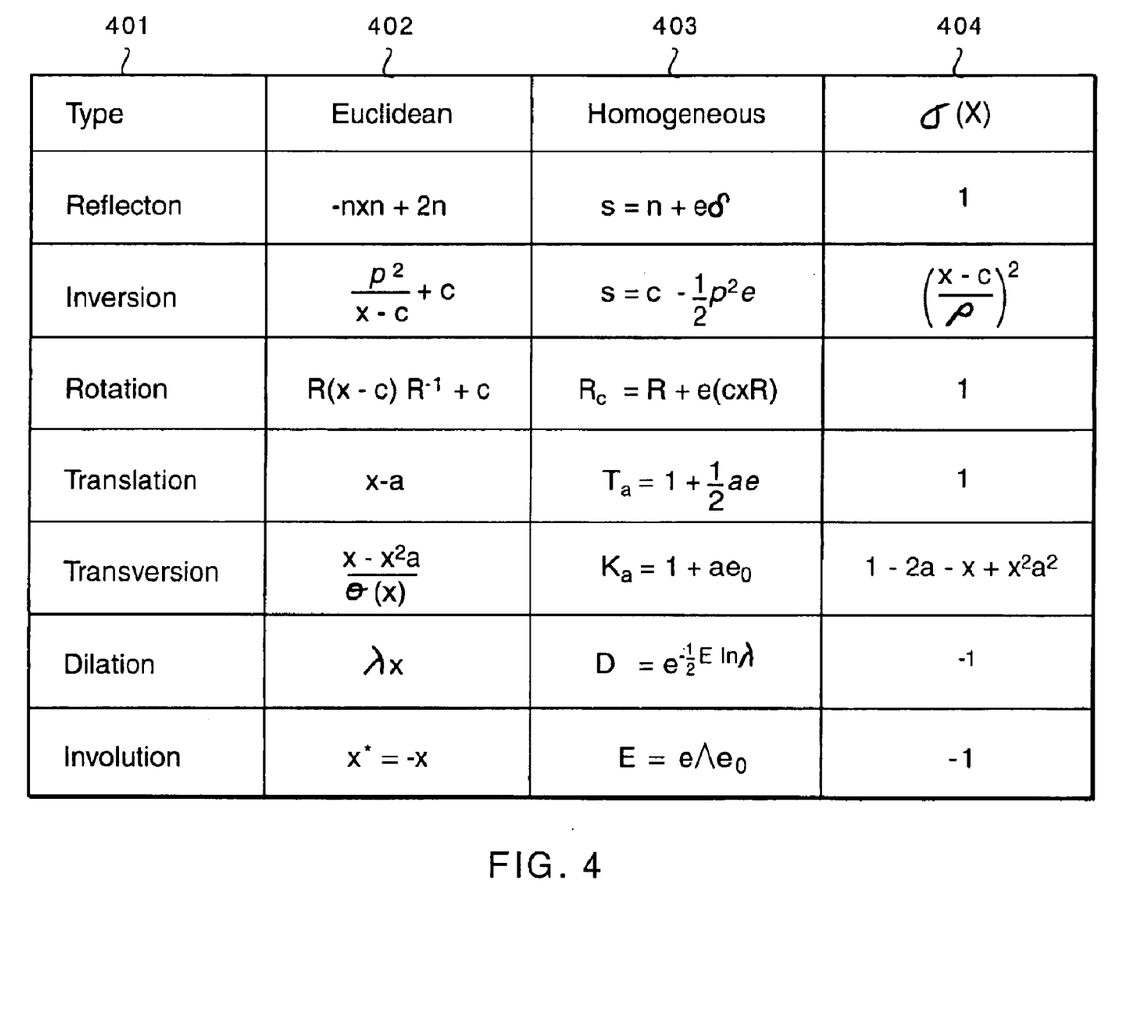
FIG. 4 is a table of transformation operations to be applied to objects according to the invention.

FIG. 4 shows all conformal transformations that can be applied to input points and homogeneous points. In our homogeneous form, composition of transformations is accomplished by simple linear multiplications, as opposed to nesting functions in the standard Euclidean form. Also, note that our homogeneous transformations never require division or addition.

In FIG. 4, column 401 shows different types of transformations, column 402 non-linear transformations of prior art Euclidean space, column 403 linear homogeneous transformations, and column 404 scalars. In FIG. 4, the symbols are used as follows, x a point in Euclidean space, n normal to a plane, e a null vector, $\delta$ a displacement, $\rho$ a radius, c a center, R a rotation, T a translation, $\sigma$ and $\lambda$.

Application Example

Figure 5:
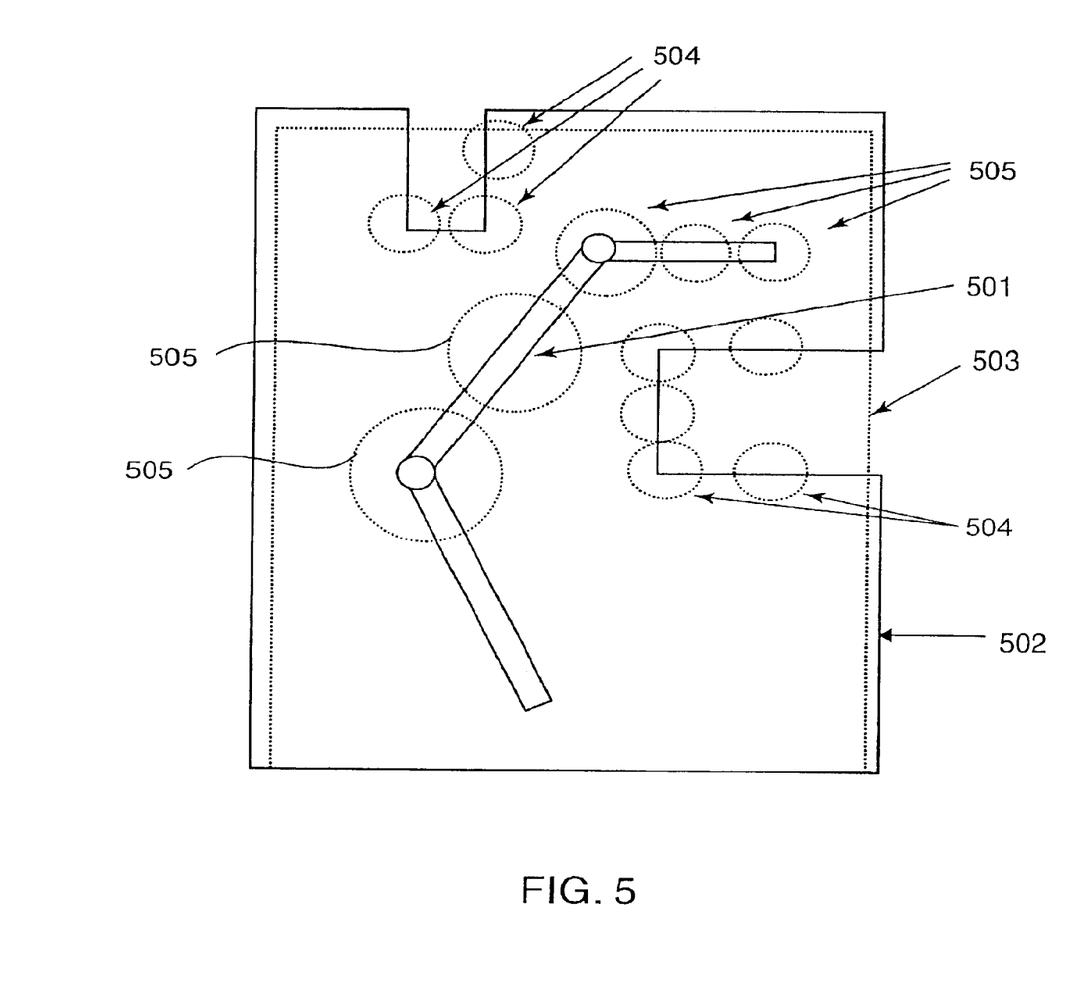
FIG. 5 is a schematic of a robot and an obstacle modeled by the invention.

FIG. 5 shows a robot 501 operating within the confines of an obstacle 502.

The obstacle is associated with bounding planes and box 503, and bounding spheres 504, and the robot is associated with bounding spheres 505. As the robot 501 moves, it is important to avoid hitting the obstacle 502. The calculation to determine interference must be made quickly.

Our invention models the robot and obstacle by a few well chosen spheres and planes in homogeneous form. We then test for interference using the homogeneous operations as defined above. If the spheres that model the robot are not allowed to intersect the spheres and planes of the obstacle, then it is ensured that the robot will not collide with the obstacle. Therefore, we encode the robot and its operation in homogeneous form, and then apply the appropriate operations (methods) 104 to determine the distances between the various spheres, planes, and lines.

In addition, our operations can determine the dynamics of each robot link, for given input torques, forces and momentums, and link lengths. Similar methods apply, for instance, in CAD/CAM where fast intersection of objects can use a collection of bounding spheres.

Finally, the motion (transformations) of the robot can be determined because all rigid body motions are conformal. The modeler 120 can determine the motion by a linear sequence of multiplications, instead of the more traditional combinations of adds and multiplies.

Conclusions and Effect of the Invention

We have described how an object, measured or defined in Euclidean space, can be encoded as a model in a homogeneous space. After encoding, complex non-linear operations in Euclidean space become simple linear operations in homogeneous space. This greatly simplifies operations on planes and spheres that are frequently used in robotics, kinematics, and computer graphics.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for modeling a moving object composed of one or more components, comprising:

inputting data for each component of the object, the data including coordinates expressed in Euclidean space for a plurality of points x of each component;

encoding, for each component, each point x as a null vector x in a homogeneous space by $x=(x+\frac{1}{2}x^2e+e_*)E=xE-\frac{1}{2}x^2e+e_*$, where e and $e_*$ are null vectors of with unit bivector $E=e \wedge e$;

associating a plurality of general homogeneous operators with each component to generate a model of the object; and determining a motion of the object by a time dependent displacement versor $D=D(t)$ satisfying a differential equation $\dot{D}=\frac{1}{2}VD$, with "screw velocity" V given by $V=-I\omega+ev$, where $\omega$ is a velocity and $v$ is a rotational translational velocity of the object, wherein the object is a rigid body.

2. The method of claim 1 further comprising:

supplying run-time parameters for the plurality of operators; and applying the plurality of general homogeneous operators to each encoded point x of each associated component to manipulate the model of the object.

3. The method of claim 1 further comprising:

measuring a scalar distance $d_{ab}$ between two component points a and b encoded as homogeneous points a and b by $d_{ab}^2=(a-b)^2=-2a\cdot b$.

4. The method of claim 1 wherein a line through component points a and b encoded as homogeneous points a and b is modeled by $e \wedge a \wedge b$, and a length $l_{ab}$ of a line segment connecting component points a and b is generated by:

$(l_{ab})^2=(e \wedge a \wedge b)^2=(a-b)^2$.

5. The method of claim 1 wherein a plane through component points a, b, and c encoded as homogeneous points a, b, and c is modeled by $e \wedge a \wedge b \wedge c$, and an area $A_{abc}$ is generated by $(A_{abc})^2 \frac{1}{4}(e \wedge a \wedge b \wedge c)^2$.

6. The method of claim 1 wherein a sphere s with radius r centered at a component point c encoded as homogeneous point c is encoded as a vector $s=c+\frac{1}{2}r^2 e$.

7. The method of claim 6 wherein a distances between a homogeneous component point a and a component sphere s is generated by an inner product $a \cdot s$.

8. The method of claim 6 wherein a distance between two component spheres $s_1=c_1+\frac{1}{2}r_1^2 e$ and $s_2=c_2+\frac{1}{2}r_2^2 e$ is generated by $s_1 \cdot s_2=c_1 \cdot c_2+\frac{1}{2}(r^1_2+r^2_2)=\frac{1}{2}[r_1^2+r_2^2)-(c_1-c_2)^2]$.

9. The method of claim 1 wherein a sphere s determined by four component points a, b, c, d encoded as homogeneous points a,b,c,d is generated by $s=(a \wedge b \wedge C)(a \wedge b \wedge C \wedge e)^{-1}$.

10. The method of claim 1 wherein a plane through component points a,b,c is encoded as a vector $p=I(a \wedge b \wedge C \wedge e)|a \wedge b \wedge c \wedge e|^{-1}$, where I is a unit pseudoscalar.

11. The method of claim 10 wherein a distance between a component homogeneous point a and a component plane p is generated by an inner product $a \cdot p$.

12. The method of claim 1, wherein dynamics of the rigid body are determined by a differential equation $\dot{P}=W$, where $P=-IL+e_*p$, and $W=-IT+e_*F$, where L is an angular momentum and p is a translational momentum of the rigid body, while T is a net torque and F is a net force on the rigid body.

13. The method of claim 1 wherein the rigid body includes n linked rigid components, and a motion of the rigid body is modeled by n time dependent displacement versors $D_1, D_2, \ldots D_n$, with a motion of a $k^{th}$ linked rigid component determined by a versor product $D_1 D_2 \ldots D_k$.

14. The method of claim 1 wherein the objects is a robot composed of a plurality of rigid bodies connected at joints.

* * * * *